United States Patent [19]

Eden

[11] Patent Number: 4,587,565
[45] Date of Patent: May 6, 1986

[54] PRESSURE SENSITIVE FILM DISPLAY HAVING MULTIPLE GRAY LEVELS

[75] Inventor: Dayton D. Eden, Dallas, Tex.

[73] Assignee: LTV Aerospace and Defense Company, Dallas, Tex.

[21] Appl. No.: 599,460

[22] Filed: Apr. 12, 1984

[51] Int. Cl.$^4$ .............................................. H04N 3/14
[52] U.S. Cl. .................................. 358/235; 358/241; 340/783; 340/793
[58] Field of Search ............... 358/235, 213, 232, 241, 358/61, 62; 340/783, 786, 793, 713

[56] References Cited

U.S. PATENT DOCUMENTS

| | | | |
|---|---|---|---|
| 4,009,488 | 2/1977 | Smith | 358/232 |
| 4,065,791 | 12/1977 | Kowel | 358/213 |
| 4,236,156 | 11/1980 | Eden | 358/235 |

OTHER PUBLICATIONS

Investigation of Display Techniques Using Elastic Surface Waves Storage, by V. Blackledge, et al., IEEE Journal of Solid-State Circuits, vol. SC-5, No. 5 (Oct. 1970) pp. 244-249.

*Primary Examiner*—Tommy P. Chin
*Attorney, Agent, or Firm*—Stephen S. Sadacca; James M. Cate

[57] ABSTRACT

A pressure sensitive film display is disclosed having a piezoelectric substrate and a thin film of pressure sensitive phase change material disposed thereon. A film of pressure sensitive material such as samarium sulfide is deposited on a piezoelectric substrate and exhibits a marked increase in reflectance at a region thereof subjected to a pressure in excess of a selected threshold pressure. Three interdigital surface acoustic wave transducers are provided along three edges of the display and are utilized to produce selective surface acoustic wave pulses in the surface of the film. Each surface acoustic wave pulse generates an area of pressure such that an external pressure greater than the selected threshold pressure is generated only at each point where three surface acoustic wave pulses intersect. Circuitry is provided for ensuring that all three surface acoustic wave pulses can intersect at any selected region of the film and the pulsewidth of at least one surface acoustic wave pulse is selectively varied to allow only a selected portion of any selected region to exhibit the increase in reflectance. In this manner the gray level of each selected region may be altered accordingly.

14 Claims, 4 Drawing Figures

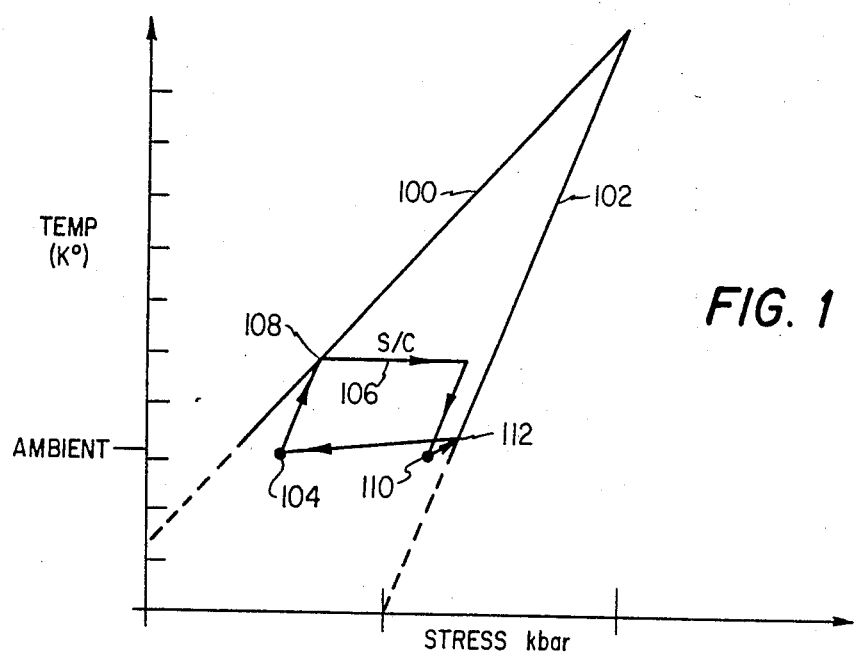
FIG. 1
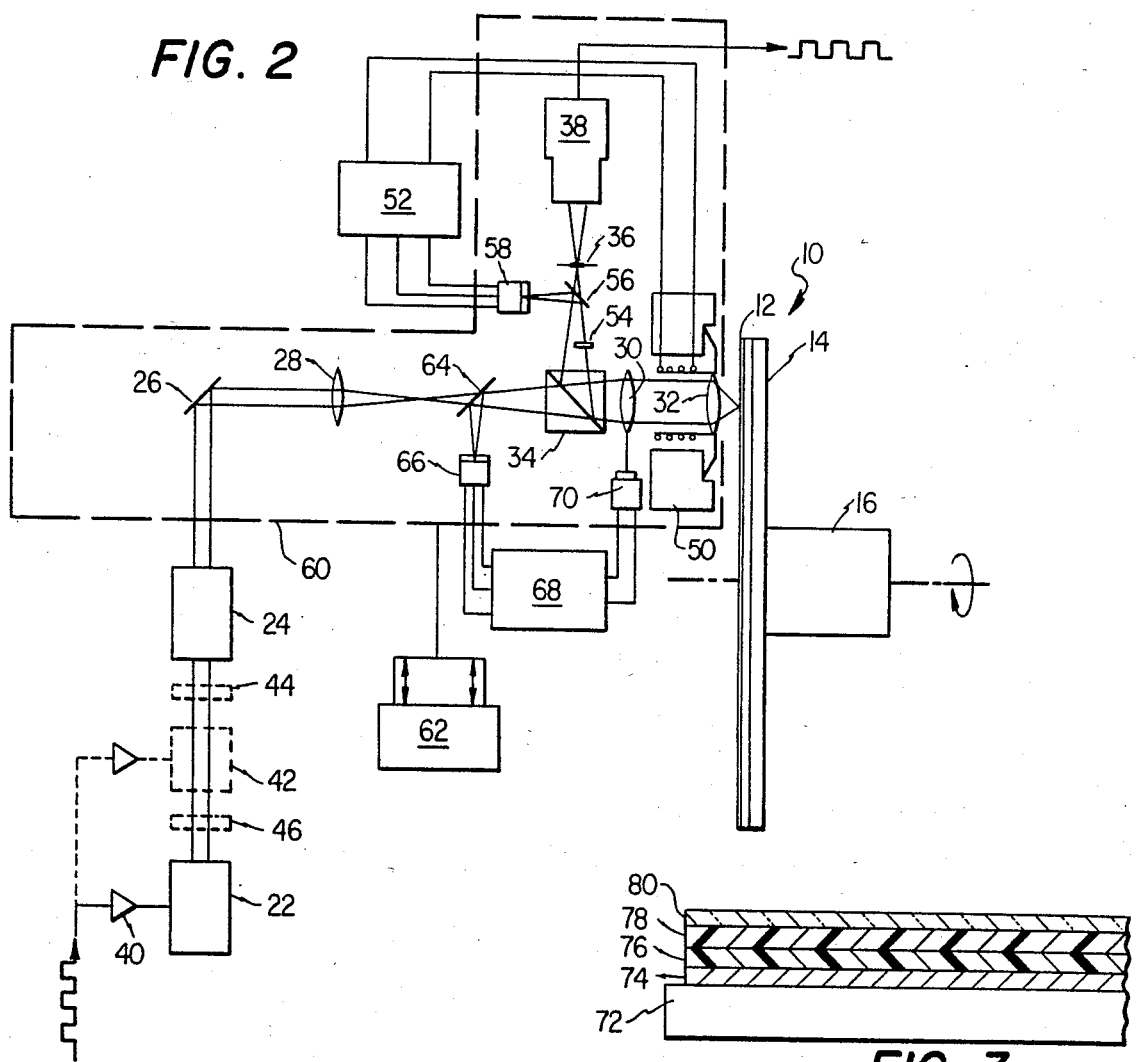
FIG. 2
FIG. 3

PRESSURE SENSITIVE FILM DISPLAY HAVING MULTIPLE GRAY LEVELS

BACKGROUND OF THE INVENTION

This invention relates to video display systems in general and in particular to the creation of images in pressure sensitive phase change material films. Still more particularly, this invention relates to a method and apparatus for generating multiple gray level video displays in pressure sensitive phase change material films.

Video display systems are well known in the prior art. The ubiquitous raster scanned cathode ray tube display is commonly utilized in television and other video displays and has been so utilized for many years. Recently attempts have been made to generate a "flat" display for televisions and the like by utilizing a very complex liquid crystal display system. Another recent development in the area of flat displays is the utilization of thermochromic or pressure sensitive films. These types of materials and others are known to exhibit optically discernible phase changes when subjected to selected temperatures, pressures or electrical fields.

An excellent example of this type of display system may be seen in U.S. Pat. No. 4,236,156, issued to the inventor herein. This patent discloses a technique for writing and erasing data into a thin film of thermochromic or pressure sensitive film utilizing a combination of lasers and/or surface acoustic waves to affect an optically discernible phase change in the film material.

Another example of this type of display system is disclosed in U.S. Pat. No. 4,009,488, issued to Ronald S. Smith. The Smith patent discloses a video display system which includes a stress wave propagating apparatus which defines a viewing plane and includes a device for initiating propagation of stress waves in a first scanning direction. A light emitting apparatus is utilized to provide a second scan line and the emitted light is modulated by a video signal and interacts with the stress wave to result in a video display.

Each of the aforementioned display systems operates in an acceptable manner; however, such systems all exhibit a common shortcoming. While it is well within the scope of such systems to "switch" a single image element or "pixel," the complexity and quantity of image elements necessary to provide multiple gray levels within an image is a very difficult technical problem to overcome. In order to provide multiple gray levels it is necessary to vary the intensity of an image element or pixel which is barely visible to the human eye. As might well be imagined, the sheer number of such elements necessary for a reasonable sized display is overwhelming.

SUMMARY OF THE INVENTION

It is therefore one object of the present invention to provide an improved video display system.

It is another object of the present invention to provide an improved flat video display system.

It is yet another object of the present invention to provide an improved flat video display system utilizing a thin film of pressure sensitive material.

It is another object of the present invention to provide an improved flat video display system utilizing a thin film of pressure sensitive material having multiple gray levels within the display.

It is still another object of the present invention to provide an improved flat video display system utilizing a thin film of pressure sensitive material having multiple gray levels within the display without an undue increase in the complexity thereof.

The foregoing objects and others are achieved as is now described. A pressure sensitive film display is provided having a piezoelectric substrate and a thin film of pressure sensitive phase change material disposed thereon. A film of pressure sensitive material such as samarium sulfide is deposited on a piezoelectric substrate and exhibits a marked increase in reflectance at a region thereof subjected to a pressure in excess of a selected threshold pressure. Three interdigital surface acoustic wave transducers are provided along three edges of the display and are utilized to produce selective surface acoustic wave pulses in the surface of the film. Each surface acoustic wave pulse generates an area of pressure such that an external pressure greater than the selected threshold pressure is generated only at each point where three surface acoustic wave pulses intersect. Circuitry is provided for ensuring that all three surface acoustic wave pulses can intersect at any selected region of the film and the pulsewidth of at least one surface acoustic wave pulse is selectively varied to allow only a selected portion of any selected region to exhibit the increase in reflectance. In this manner the gray level of each selected region may be altered accordingly.

BRIEF DESCRIPTION OF THE DRAWINGS

The novel features believed characteristic of the invention are set forth in the appended claims. The invention itself; however, as well as a preferred mode of use, further objects and advantages thereof, will best be understood by reference to the following detailed description of an illustrative embodiment when read in conjunction with the accompanying drawings, wherein:

FIG. 1 is a partially diagrammatic and partially schematic view of the novel display system of the present invention;

FIG. 2 is a greatly enlarged view of one surface acoustic wave transducer of the novel display system of FIG. 1; and FIGS. 3a and 3b are pictorial representations of two surface acoustic wave pulses such as may be utilized with the novel display system of the present invention.

DETAILED DESCRIPTION OF THE PREFERRED EMBODIMENT

There are numerous materials which exhibit an optically discernible phase change in response to external stimuli. Compounds which respond primarily to temperature changes include certain ternary halides such as $Cu_2HgI_4$, and some transition metal oxides such as vanadium oxide. Other compounds respond primarily to pressure, such as the rare earth monochalcogenides, including samarium sulfide and other gandolinium and lanthinium compounds. Still other organometallic compounds respond to various electric fields. An example of these compounds is tetracyanoquinodimethane (TCNQ). While the present invention deals primarily with pressure sensitive material, it is contemplated that the techniques disclosed herein may find application in the utilization of other materials.

Referring now to the figures, and in particular with reference to FIG. 1, there is depicted a partially diagrammatic, partly schematic view of the novel display system of the present invention. As can be seen, the display system includes a substrate 10 constructed of a piezoelectric material such as potassium dihydrogen phosphate, lithium niobate or quartz. Deposited on the surface of substrate 10 is a thin film of pressure sensitive material 12. In a preferred emodiment of the present invention, film 12 is provided utilizing one of the rare earth monochalocogenides such as samarium sulfide, samarium selenide, samarium telluride or samarium oxide. Like other known thermochromic materials these pressure sensitive films exhibit a hysteresis effect. That is, a phase change brought about by the application of an external pressure will remain unchanged after the removal of that pressure, if the film of material is biased at the proper point in its hysteresis loop.

Samarium sulfide, one of the preferred materials for implementing the present invention, is particularly useful in the display of visual information because its semiconductor band edge is about five thousand Angstroms. Samarium sulfide has a low absorption in its semiconductor state and a high absorption in its metal state in both the visible and infrared spectra.

A thin film 12 of samarium sulfide is deposited on substrate 10 utilizing standard vacuum deposition techniques or any other suitable technique. By utilizing a substrate which has a slightly different coefficient of thermal expansion it is possible to bias the film with a selected stress by heating the substrate during such deposition techniques. In this manner, it is possible to provide a prebiased film of pressure sensitive material which will exhibit an optically discernible phase change in response to pressures greater than a preselected threshold pressure. Of course, those skilled in the art will appreciate that various dopant additives may be utilized in conjunction with a pressure sensitive film material to adjust this desired threshold pressure.

As taught in the art, it is possible to generate a sufficient stress to "switch" regions of film 12 by utilizing surface acoustic waves. Surface acoustic waves are elastic sonic waves which travel along the free surface of a solid having both longitudinal and shear components with zero normal force in the plane of the surface. Surface acoustic waves can be generated at the free surface of certain piezoelectric crystals by applying a voltage to the crystal which causes elastic dilation or contraction of the crystal, resulting in the generation of surface acoustic waves along the surface. The energy of these waves is confined to the interface between the crystal surface and the air or, in the case of a film on the surface of the crystal, within the film. These waves propagate along the surface of such crystals at relatively high velocities. For example, in lithium niobate crystals or quartz, these waves travel at a velocity of about $3 \times 10^5$ centimeters per second.

By applying a suitable voltage to these crystals, a surface acoustic wave can be generated which has sufficient energy to alter the optical characteristics of the pressure sensitive film. A particularly efficient device for generating such surface acoustic waves is an interdigital transducer which may be formed on piezoelectric substrate 10. The depicted embodiment of the present invention utilizes three such interdigital transducers 14, 16 and 18. Each interdigital transducer consists of two electrodes disposed upon the upper surface of the piezoelectric substrate, each having a series of spaced fingers which are interdigitally spaced to form electrode pairs in the manner which is depicted in FIG. 2. As can be seen, each interdigital transducer is coupled to a controllable pulse generator 20 which is utilized to generate a signal of sufficient power and frequency to match the resolution required for the desired image. An associated delay unit 22 is coupled with each controllable pulse generator to permit the pulse being applied to the interdigital transducers to be timed in an extremely accurate manner.

As illustrated, each controllable pulse generator 20 is coupled to a single control unit 24 which generates suitable control signals which can be utilized to vary the frequency of each individual pulse emitted by any controllable pulse generators. Those ordinarily skilled in the art will appreciate that without using control unit 24 and by restricting controllable pulse generators 20 to generate pulses at a fixed frequency of approximately fifty megahertz and at selected times, it will be possible to generate three surface acoustic wave pulses which can intersect at any point on the display formed by pressure sensitive film 12. Again, assuming that each surface acoustic wave pulse creates a region of pressure slightly greater than one third of the threshold pressure necessary to switch the state of film 12, only those regions where all three surface acoustic wave pulses intersect will experience an external pressure sufficiently great to switch a region of film 12. The pulsewidth associated with a fifty megahertz signal is sufficiently narrow that regions of film 12 on the order of thirty microns in diameter may be switched. Again, those skilled in the optical display art will appreciate that in order to present an optically coherent display it is necessary that the system be able to switch a display element or "pixel" which is barely discernible to the unaided human eye.

Referring now to FIG. 2, there is depicted a greatly enlarged view of one surface acoustic wave transducer of the novel display system of FIG. 1. As can be seen, the interdigital transducer depicted in FIG. 2 comprises electrodes 26 and 28, each of which includes a plurality of spaced finger electrodes which are interdigitally spaced to form a plurality of electrode pairs. Electrodes of a sufficiently minute nature may be simply and easily formed on the piezoelectric substrate by utilizing commonly known deposition techniques such as are commonly utilized in the manufacture of a metallization layer in an integrated circuit device. By utilizing electrodes of this design, an electric field created between electrodes 26 and 28 will cause a deformation of substrate 10 which in turn creates a surface acoustic wave on the surface of substrate 10 and in film 12.

Referring now to FIGS. 3a and 3b, there are depicted pictorial representations of two surface acoustic wave pulses such as may be utilized with the novel display system of the present invention. As can be seen, each pulse occupies an interval $t_w$ which may be thought of as the spot or pixel writing interval in the display system of the present invention. However, each pulse also includes a primary pulse having a pulsewidth labeled $t_p$, which when combined with two other pulses contains sufficient energy to create the pressure region necessary to switch a portion of film 12. As can be seen, when a narrower pulsewidth $t_p$ is utilized as depicted in FIG. 3b, the area of the resultant intersection is much smaller, resulting in a much smaller spot or pixel in the display. Of course, it should be apparent that an intersection of three negative pulses can be utilized to "erase" a region which has previously been "written" by the intersection of three positive pulses.

An important feature of the present invention involves the discovery that by varying the frequency and pulsewidth of at least one pulse which is applied to an interdigital transducer, it is possible to vary the area of film 12 which will experience sufficient pressure to exhibit a phase change. By varying the frequency of at least one of the pulses generated by controllable pulse generators 20 between fifty and two hundred megahertz it is possible to vary the diameter of the resultant region of film 12 which will be switched from thirty microns to seven and one half microns. In this manner, those ordinarily skilled in the art should appreciate, that it is possible to define a plurality of subelements or subpixels which are barely discernible to the unaided human eye. By utilizing control unit 24 to vary the frequency of the pulses generated by controllable pulse generators 20, it is then possible to effect an optically discernible phase change on a small portion of each pixel, thereby generating a variable optical effect within a single pixel.

By varying the frequency of the surface acoustic wave pulse in multiple steps between fifty and two hundred megahertz, and by utilizing delay units 22 to minutely vary the position of a selected region within each pixel, it is possible to generate many different levels within each pixel by effecting incremental portions of the region of film 12 within that pixel. For example, by utilizing only five spots within each pixel or picture element, having diameters of 7.5 microns, 10.6 microns, 15 microns, 21.2 microns and 30 microns and by writing each of these five spots within a different, non overlapping area of each pixel, it is possible to utilize a binary scheme to generate thirty-two separate and distinct gray levels within each pixel, because each spot will have an area twice as large as the next smaller spot and half as large as the next larger spot. In this manner, each spot can be assigned a different power of two in a binary scheme. Thus, it should be apparent that without an undue increase in the complexity of the display system of the present invention, it is possible to provide $2^N$ gray levels within each picture element or pixel by controlling the presence or absence of different subelements within each pixel. This may be accomplished simply and easily by controlling the frequency and thus the pulsewidth of the excitation signal which serves to generate the switching surface acoustic wave pulses.

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. It is therefore contemplated that the appended claims will cover any such modifications or embodiments that fall within the true scope of the invention.

What is claimed is:

1. A video display system having multiple gray levels, said video display system comprising:

a piezoelectric substrate;

a thin film of pressure sensitive phase change material disposed on the surface of said substrate, said material exhibiting an optically discernible phase change at any portion thereof subjected to an external pressure in excess of a predetermined threshold pressure and exhibiting hysteresis such that said optically discernible phase change at any such portion is substantially unchanged after said external pressure is removed;

first, second and third surface acoustic wave transducers disposed on the surface of said substrate for generating surface acoustic wave pulses on the surface thereof and in said film, each of said surface acoustic wave pulses having a variable pulsewidth and creating an area of pressure such that an external pressure greater than said predetermined threshold pressure is created at any point where three of said surface acoustic wave pulses intersect;

timing means coupled to said first, second and third acoustic wave transducers for initiating generation of surface acoustic wave pulses wherein three of said surface acoustic wave pulses will intersect within each of a selected plurality of regions; and means for selectively varying the pulsewidth of said surface acoustic wave pulses wherein only a selected portion of each of said selected plurality of regions will exhibit said optically discernible phase change.

2. The video display system having multiple gray levels according to claim 1 wherein said piezoelectric substrate comprises lithium niobate crystal.

3. The video display system having multiple gray levels according to claim 1 wherein the substrate comprises quartz.

4. The video display system having multiple gray levels according to claim 1 wherein said thin film of pressure sensitive phase change material comprises a thin film of a rare earth monochalcogenide.

5. The video display system having multiple gray levels according to claim 4 wherein said film comprises a thin film of samarium sulfide.

6. The video display system having multiple gray levels according to claim 1 wherein each of said first, second and third acoustic wave transducers includes at least one pair of electrodes on said substrate spaced apart in substantially parallel relation such that when an electric field is created between each of said pairs said substrate undergoes deformation creating a surface acoustic wave on the surface thereof and in said film.

7. A video display system having multiple gray levels, said video display system comprising:

a piezoelectric substrate;

a thin film of pressure sensitive phase change material disposed on the surface of said substrate, said material exhibiting an optically discernible phase change at any portion thereof subjected to an external pressure in excess of a predetermined threshold pressure and exhibiting hysteresis such that said optically discernible phase change at any such portion is substantially unchanged after said external pressure is removed;

first, second and third surface acoustic wave transducers disposed on the surface of said substrate for generating surface acoustic wave pulses on the surface thereof and in said film, each of said surface acoustic wave pulses having a variable pulsewidth and creating an area of pressure such that the area of pressure wherein any two of said surface acoustic wave pulses intersect will always be less than said predetermined threshold pressure and the area of pressure where three of said surface acoustic wave pulses intersect will always be greater than said predetermined threshold pressure;

timing means coupled to said first, second and third acoustic wave transducers for initiating generation of surface acoustic wave pulses wherein three of said surface acoustic wave pulses will intersect within each of a selected plurality of regions; and means for selectively varying the pulsewidth of at least one of said surface acoustic wave pulses wherein only a selected portion of each of said selected plurality of regions will exhibit said optically discernible phase change.

8. The video display system having multiple gray levels according to claim 7 wherein said piezoelectric substrate comprises lithium niobate crystal.

9. The video display system having multiple gray levels according to claim 7 wherein the substrate comprises quartz.

10. The video display system having multiple gray levels according to claim 7 wherein said thin film of pressure sensitive phase change material comprises a thin film of a rare earth monochalcogenide.

11. The video display system having multiple gray levels according to claim 10 wherein said film comprises a thin film of samarium sulfide.

12. The video display system having multiple gray levels according to claim 7 wherein each of said first, second and third acoustic wave transducers includes at least one pair of electrodes on said substrate spaced apart in substantially parallel relation such that when an electric field is created between each of said pairs said substrate undergoes deformation creating a surface acoustic wave on the surface thereof and in said film.

13. A method of generating multiple gray levels in a selected region of a pressure sensitive film which exhibits an optically discernible phase change when subjected to an external pressure in excess of a predetermined threshold pressure and which exhibits hysteresis such that said optically discernible phase change remains substantially unchanged after said external pressure is removed, comprising the steps of:
generating at least three surface acoustic wave pulses in said film, each creating an area of pressure such that the area of pressure where any two of said surface acoustic wave pulses intersect will always be less than said predetermined threshold pressure and the area of pressure where three of said surface acoustic wave pulses intersect will always be greater than said predetermined threshold pressure;
causing said at least three surface acoustic wave pulses to intersect within said selected region; and
varying the pulsewidth of at least one of said surface acoustic wave pulses wherein a selected portion of said selected region of pressure sensitive film will exhibit said optically discernible phase change.

14. A method of generating multiple gray levels in selected regions of a pressure sensitive film which exhibits an optically discernible phase change when subjected to an external pressure in excess of a predetermined threshold pressure and which exhibits hysteresis such that said optically discernible phase change remains substantially unchanged after said external pressure is removed, comprising the steps of:
generating a first surface acoustic wave pulse in said film at a first selected time;
generating a second surface acoustic wave pulse in said film in a direction perpendicular to said first surface acoustic wave pulse at a second selected time;
generating a third surface acoustic pulse in said film in a direction substantially opposite of said second surface acoustic wave pulse at a third selected time, each of said first, second and third acoustic wave pulses creating an area of pressure such that the area of pressure where any two of said surface acoustic wave pulses intersect will always be less than said predetermined threshold pressure and the area of pressure where said three of said surface acoustic wave pulses intersect will always be greater than said predetermined threshold pressure,
repetitively selecting said first, second and third selected times so that said first, said second and said third surface acoustic wave pulses will intersect in said selected regions of said pressure sensitive film; and
selectively varying the pulsewidth of at least one of said first, said second or said third surface acoustic wave pulse wherein only a selected portion of each of said selected regions will exhibit said optically discernible phase change.

* * * * *